US011398910B2

(12) United States Patent
Girish et al.

(10) Patent No.: US 11,398,910 B2
(45) Date of Patent: *Jul. 26, 2022

(54) TOKEN PROVISIONING UTILIZING A SECURE AUTHENTICATION SYSTEM

(71) Applicant: VISA International Service Association, San Francisco, CA (US)

(72) Inventors: Aparna Krishnan Girish, Fremont, CA (US); Parveen Bansal, San Ramon, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 16/660,117

(22) Filed: Oct. 22, 2019

(65) Prior Publication Data

US 2020/0052897 A1 Feb. 13, 2020

Related U.S. Application Data

(63) Continuation of application No. 15/649,923, filed on Jul. 14, 2017, now Pat. No. 10,491,389.

(51) Int. Cl.
*H04L 29/06* (2006.01)
*H04L 9/32* (2006.01)
(Continued)

(52) U.S. Cl.
CPC .............. *H04L 9/3213* (2013.01); *H04L 9/30* (2013.01); *H04L 9/3231* (2013.01);
(Continued)

(58) Field of Classification Search
None
See application file for complete search history.

(56) References Cited

U.S. PATENT DOCUMENTS 5,613,012 A 3/1997 Hoffman et al.
5,781,438 A 7/1998 Lee et al.
(Continued)

FOREIGN PATENT DOCUMENTS

EP 2156397 2/2010
WO 0135304 5/2002
(Continued)

OTHER PUBLICATIONS

EP18831317.5, "Extended European Search Report", dated Jun. 29, 2020, 7 pages.
(Continued)

*Primary Examiner* — Tri M Tran
(74) *Attorney, Agent, or Firm* — Kilpatrick Townsend & Stockton LLP

(57) ABSTRACT

Systems and methods of the invention are directed to provisioning a token by a secure authentication system. A user may initiate a transaction that causes a resource provider computer to transmit an authentication request message to a directory server computer. The directory server computer may transmit the authentication request message to an access control server computer for authentication. Subsequent to receiving the authentication request message, the directory server computer may request a token for the transaction from a token provider computer. If authentication is successful, the token may be included in an authentication response message transmitted by the directory server computer to the resource provider computer. The token may then be utilized by the resource provider computer in lieu of sensitive user information for any suitable purpose. In some embodiments, user-specific-data provided by the access control server computer may be included in the authentication response message.

17 Claims, 6 Drawing Sheets

(51) Int. Cl.
*H04L 9/30* (2006.01)
*H04L 9/08* (2006.01)

(52) U.S. Cl.
CPC .......... *H04L 9/3247* (2013.01); *H04L 9/3271* (2013.01); *H04L 9/08* (2013.01); *H04L 9/32* (2013.01); *H04L 2209/56* (2013.01)

(56) References Cited

U.S. PATENT DOCUMENTS

| | | |
|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,533,860 B1 | 9/2013 | Grecia |
| 8,538,845 B2 | 9/2013 | Liberty |
| 8,555,079 B2 | 10/2013 | Shablygin et al. |

(56) References Cited

U.S. PATENT DOCUMENTS

| | | |
|---|---|---|
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |

(56) References Cited

U.S. PATENT DOCUMENTS

| | | |
|---|---|---|
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0116976 A1 | 5/2012 | Hammad et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Said |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Caiman |
| 2014/0025585 A1 | 1/2014 | Caiman |
| 2014/0025958 A1 | 1/2014 | Caiman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |

(56) References Cited

U.S. PATENT DOCUMENTS

| | | |
|---|---|---|
| 2014/0040144 A1 | 2/2014 | Plomske et al. |
| 2014/0040145 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0279477 A1 | 9/2014 | Sheets et al. |
| 2014/0294701 A1 | 10/2014 | Dai et al. |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0120560 A1 | 4/2015 | Fisher et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0110711 A1 | 4/2016 | Collinge et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0210628 A1 | 7/2016 | McGuire |
| 2016/0218875 A1 | 7/2016 | Le Saint et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0301683 A1* | 10/2016 | Laxminarayanan |
| 2016/0321652 A1* | 11/2016 | Dimmick ......... G06Q 20/38215 |

2016/0301683 A1* ... G06Q 20/027

FOREIGN PATENT DOCUMENTS

| | | |
|---|---|---|
| WO | 2004042536 | 5/2004 |
| WO | 2006113834 | 10/2006 |
| WO | 2009032523 | 3/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

Application No. EP18831317.5 , Office Action, dated Feb. 4, 2022, 5 pages.

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

U.S. Appl. No. 15/649,923 , "Final Office Action", dated May 24, 2019, 14 pages.

U.S. Appl. No. 15/649,923 , "Non-Final Office Action", dated Jan. 18, 2019, 14 pages.

U.S. Appl. No. 15/649,923 , "Notice of Allowance", dated Aug. 20, 2019, 17 pages.

U.S. Appl. No. 61/738,832 , "U.S. Provisional Application No ", Management of Sensitive Data, filed Dec. 18, 2012, 22 pages.

U.S. Appl. No. 61/751,763 , "U.S. Provisional Application No ", Payments Bridge, filed Jan. 11, 2013, 64 pages.

U.S. Appl. No. 61/892,407 , "U.S. Provisional Application No ", Issuer Over-The-Air Update Method and System, filed Oct. 17, 2013, 28 pages.

U.S. Appl. No. 61/894,749 , "U.S. Provisional Application No ", Methods and Systems for Authentication and Issuance of Tokens in a Secure Environment, filed Oct. 23, 2013, 67 pages.

U.S. Appl. No. 61/926,236 , "U.S. Provisional Application No ", Methods and Systems for Provisioning Mobile Devices With Payment Credentials and Payment Token Identifiers, filed Jan. 10, 2014, 51 pages.

U.S. Appl. No. 62/000,288 , "U.S. Provisional Application No ", Payment System Canonical Address Format, filed May 19, 2014, 58 pages.

U.S. Appl. No. 62/003,717 , "U.S. Provisional Application No ", Mobile Merchant Application, filed May 28, 2014, 58 pages.

U.S. Appl. No. 62/024,426 , "U.S. Provisional Application No ", Secure Transactions Using Mobile Devices, filed Jul. 14, 2014, 102 pages.

U.S. Appl. No. 62/037,033 , "U.S. Provisional Application No ", Sharing Payment Token, filed Aug. 13, 2014, 36 pages.

U.S. Appl. No. 62/038,174 , "U.S. Provisional Application No ", Customized Payment Gateway, filed Aug. 15, 2014, 42 pages.

U.S. Appl. No. 62/042,050 , "U.S. Provisional Application No ", Payment Device Authentication and Authorization System, filed Aug. 26, 2014, 120 pages.

U.S. Appl. No. 62/053,736 , "U.S. Provisional Application No ", Completing Transactions Without a User Payment Device, filed Sep. 22, 2014, 31 pages.

U.S. Appl. No. 62/054,346 , "U.S. Provisional Application No ", Mirrored Token Vault, filed Sep. 23, 2014, 38 pages.

U.S. Appl. No. 62/103,522 , "U.S. Provisional Application No ", Methods and Systems for Wallet Provider Provisioning, filed Jan. 14, 2015, 39 pages.

U.S. Appl. No. 62/108,403 , "U.S. Provisional Application No ", Wearables With NFC HCE, filed Jan. 27, 2015, 32 pages.

(56) References Cited

OTHER PUBLICATIONS

U.S. Appl. No. 62/117,291 , "U.S. Provisional Application No ", Token and Cryptogram Using Transaction Specific Information, filed Feb. 17, 2015, 25 pages.
U.S. Appl. No. 62/128,709 , "U.S. Provisional Application No ", Tokenizing Transaction Amounts, filed Mar. 5, 2015, 30 pages.
PCT/US2018/028906 , "International Search Report and Written Opinion", dated Aug. 13, 2018, 12 pages.

* cited by examiner

TOKEN PROVISIONING UTILIZING A SECURE AUTHENTICATION SYSTEM

The present application is a continuation of U.S. patent application Ser. No. 15/649,923 filed on Jul. 14, 2017, the entire disclosure of which is incorporated herein by reference in its entirety for all purposes.

BACKGROUND

Tokens are substitutes for real credentials such as payment credentials. Tokens can be used instead of real credentials to conduct transactions such as payment transactions. Tokens provide greater data security relative to real credentials, because if token are stolen by unauthorized persons, the real credentials are not exposed. The token can be deactivated without compromising the real credential associated with the token.

The process of token issuance typically involves a token requestor requesting a token. A token service can evaluate the token request, and can issue a token to the token requestor if it is valid.

If a token is used in a transaction such as a payment transaction, the user of the token may be required to perform an authentication process before the transaction can proceed. This can involve a computer requesting a secret from the user.

It is apparent that when conducting a transaction using a token, a number of steps are required. While the number of steps required to complete a single transaction may not appear at first glance to be problematic, when millions of transactions are taking place, the burden to computing resources in a computer network can be significant.

Embodiments of the invention address these and other problems, individually and collectively.

BRIEF SUMMARY

One embodiment of the invention is directed to a method of provisioning a token. The method may comprise receiving, by a resource provider computer associated with a resource provider, transaction data corresponding to a transaction associated with a user. The method may further comprise transmitting, by the resource provider computer to a directory server computer, an authentication request message including the transaction data and a token request indicator. The directory server computer may subsequently transmit the authentication request message to an access control server computer associated with an authorizing entity. Receipt of the authentication request message may cause the access control server computer to authenticate the user, generate a verification value representing the authentication, and transmit an authentication response message comprising the verification value to the directory server computer. The method may further comprise receiving, by the resource provider computer from the directory server computer, the authentication response message comprising the verification value, and a token, wherein the token is previously obtained by the directory server from a token provider computer.

Another embodiment of the invention is directed to a resource provider computer comprising a processor and a computer readable medium coupled to the processor, the computer readable medium comprising code, executable by the processor, for implementing a method. The method may comprise receiving transaction data corresponding to a transaction associated with a user. The method may further comprise transmitting, to a directory server computer, an authentication request message including the transaction data and a token request indicator. The directory server computer may subsequently transmit the authentication request message to an access control server computer associated with an authorizing entity. Receipt of the authentication request message may cause the access control server computer to authenticate the user, generate a verification value representing the authentication, and transmit an authentication response message comprising the verification value to the directory server computer. The method may further comprise receiving, from the directory server computer, the authentication response message comprising the verification value, and a token, wherein the token is previously obtained by the directory server from a token provider computer.

Another embodiment of the invention is directed to a directory server computer comprising a processor and a computer readable medium coupled to the processor, the computer readable medium comprising code, executable by the processor, for implementing a method. The method may comprise receiving, from a resource provider computer, an authentication request message comprising transaction data for a transaction between a user and a resource provider. The method may further comprise sending the authentication request message to an access control server computer at an issuer. Receipt of the authentication request message may cause the access control server computer to authenticate the user, generate a verification value representing the authentication, and transmit an authentication response message comprising the verification value to the directory server computer. The method may further comprise receiving, from the access control server computer, the authentication response message. The method may further comprise transmitting, to a token provider computer, a token request message including at least a portion of the transaction data. Receipt of the token request message may cause the token provider computer to generate a token corresponding to the transaction. The method may further comprise receiving, from the token provider computer, the token corresponding to the transaction. The method may further comprise transmitting, to the resource provider computer, an authentication response message comprising the token.

These and other embodiments of the invention are described in further detail below.

DETAILED DESCRIPTION

Figure 1:
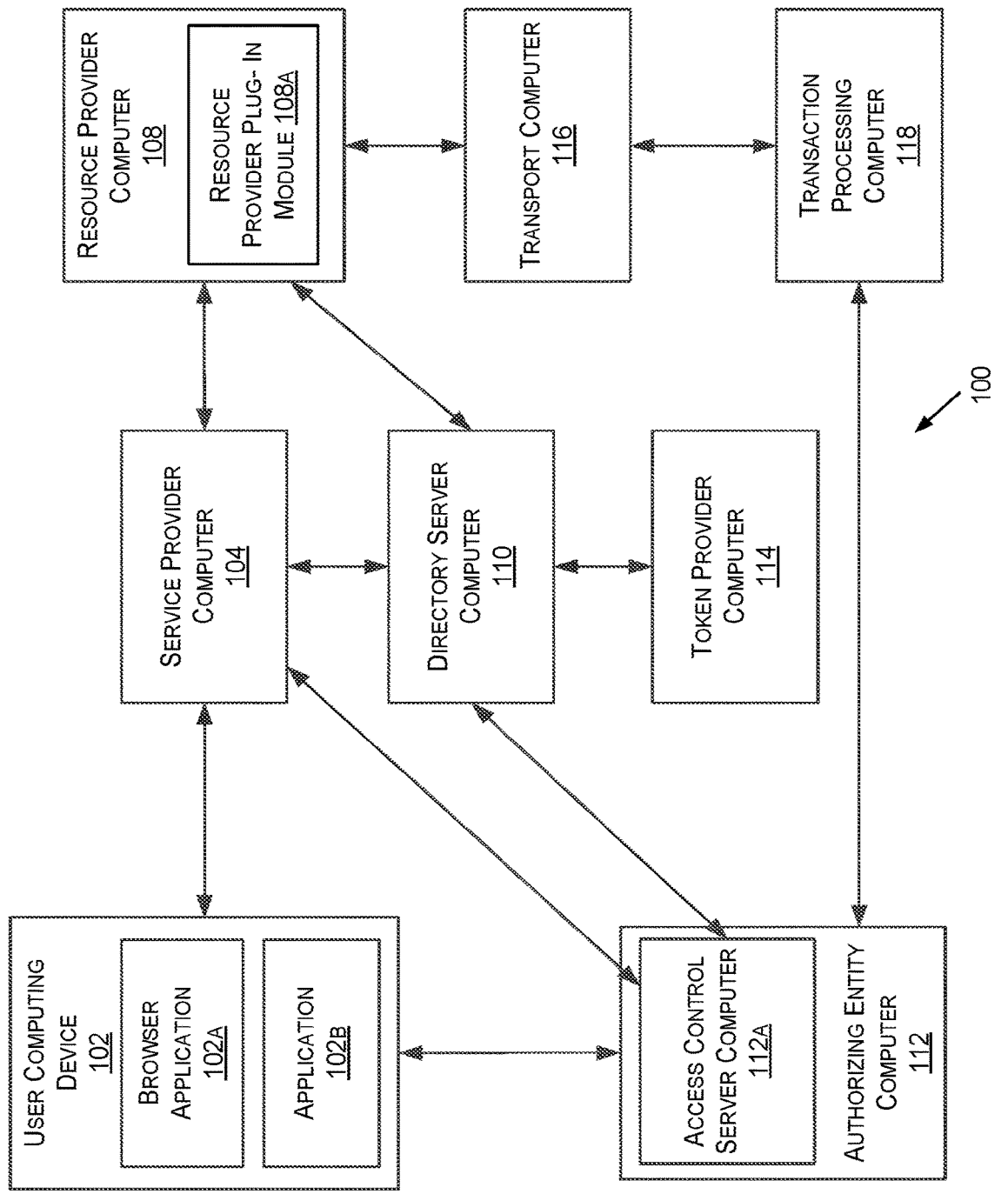
FIG. 1 shows a block diagram of a system according to an embodiment of the invention.

Embodiments of the present invention may be directed at utilizing the infrastructure of a secure authentication system to provision a token to be used for a transaction. In some embodiments of the present invention, a user may initiate a transaction (e.g., via a user computing device). A resource provider computer may receive the transaction data and request (e.g., via an authentication request message) authentication of the user to be conducted through a secure authentication system. The authentication request message may include a token request indicator that may be used 2B) to any suitable destination (e.g., service provider computer 104) the authentication process for the user, a token may be requested without requiring the resource provider computer to request the token via a separate message. Once the user has been authenticated, or at any suitable time, a token may be generated. The token may be returned to the resource provider computer via an authentication response message traditionally used for authentication purposes. In some embodiments, the authentication response message may further include user-specific data provided from the authentication entity (e.g., from an access control server computer associated with an authorizing entity of the transaction).

Embodiments of the present invention may use an existing secure authentication system (e.g., Verified by Visa™, MasterCard SecureCode™, American Express SafeKey™) to perform authentication techniques.

Embodiments of the present invention may be used in transaction processing systems or may use data generated during transaction processing through a transaction processing system. Such embodiments may involve transactions between consumers and merchants.

Before discussing detailed embodiments of the invention, some descriptions of certain terms may be useful.

A "user computing device" may be any suitable device that can perform computations and that can communicate with other devices. A mobile device is an example of a computing device. Other types of computing devices may not be mobile.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, an applications, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "secure authentication system" may one or more computing devices (e.g., servers) that provide secure authentication of users with respect to transactions conducted between two entities (e.g., users and resource providers).

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. In some embodiments, the messages sent and/or received by the resource provider computer may be sent/received by a resource provider plug-in module that may function as a proxy between a resource provider computer and an authorizing entity computer or other components within the system.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authorizing entity computer" may be operated by, or on behalf of, an authorizing entity. An authorizing entity computer may include an "access control server computer" that may be configured to authenticate a user.

An "access control server computer" may be configured to authenticate a user. An access control server computer can receive authentication request messages. An access control server computer may be configured to transmit challenge request messages and receive challenge response messages from a user computing device (or application operating thereon) or a service provider computer. In some embodiments, the access control server computer may be further configured to verify the enrollment of an account in a secure authentication program, perform a risk analysis to determine whether the transaction should be authenticated, and return an authentication response message to a resource provider computer (e.g., via a directory server computer).

A "directory server computer" may include a server that can perform message routing. In some embodiments, the directory server computer may be capable of receiving messages (e.g., authentication request messages, authentication response messages, etc.), determining the appropriate destination computer for the received messages, and routing the received messages to the appropriate destination computer (e.g., an access control server computer). In some embodiments, the directory server computer may include or be associated with a database containing routing tables that may be used to determine an appropriate authorizing entity computer associated with an account identifier (e.g., a bank identification number). In some embodiments, the directory server computer may be further configured to perform an enrollment verification process for an account identifier and a risk analysis process.

A "transaction processing server computer" may include a server computer used for transaction processing. In some embodiments, the transaction processing server computer may be coupled to a database and may include any hardware, software, other logic, or combination of the preceding for servicing the requests from one or more client computers. The transaction processing server computer may comprise one or more computational apparatuses and may use any of a variety of computing structures, arrangements, and compilations for servicing the requests from one or more client computers. In some embodiments, the transaction processing server computer may operate multiple server computers. In such embodiments, each server computer may be configured to process transaction for a given region or handles transactions of a specific type based on transaction data.

The transaction processing server computer may include data processing subsystems, networks, and operations used to support and deliver authorization services, exception file services, and clearing and settlement services. An exemplary transaction processing server computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The transaction processing server computer may use any suitable wired or wireless network, including the Internet.

The transaction processing server computer may process transaction-related messages (e.g., authorization request messages and authorization response messages) and determine the appropriate destination computer (e.g., issuer computer) for the transaction-related messages. In some embodiments, the transaction processing server computer may authorize transactions on behalf of an issuer. The transaction processing server computer may also handle and/or facilitate the clearing and settlement of financial transactions.

A "transaction request message" may be an electronic message that indicates that the user has initiated a transaction with a resource provider. A transaction request message may include transaction data associated with the transaction.

A "transaction response message" may be an electronic message that is used to respond to a transaction request message. In some embodiments, the transaction response message may indicate that the transaction associated with a transaction request message was successful or unsuccessful.

"Transaction data" may include data related to a transaction. Transaction data may include data for a specific transaction, including items purchased, item prices, total cost, shipping address, billing address, payment methods (e.g., a primary account number, card number, etc.), resource provider data (e.g., merchant data), user-specific data, user computing device data, etc.

"User computing device data" may include data associated with a user computing device. User computing device data may refer to data regarding a portable computing device, such as a computer or mobile phone. Examples of user computing device data may include unique device identifiers for a computer or mobile phone, an IP address, SIM card data, application data, mobile application data, browser data, and device make and model data. User computing device data may also include the device's MSISDN, or Mobile Subscriber Integrated Services Digital Network-Number, which is a number that uniquely identifies a subscription in a mobile network.

"User-specific data" may include data specific to a user. User-specific data may include a name, mailing address, shipping address, billing address, phone number, payment account number, date of birth, marital status, income, social security number, demographic data, etc. In some embodiments, user-specific data may also include consumer preferences, notification methods, and prior transaction history.

A "challenge request message" may include a message sent as part of an authentication process for a user and/or user computing device. In some embodiments, the challenge request message may contain a request for the user to submit a pre-established authentication data in order to authenticate an account or payment device. The challenge request message may be generated and sent (e.g., by an access control server computer) prior to authenticating the account or payment device.

A "challenge response message" may include a message sent as part of an authentication process for a user and/or user computing device. In some embodiments, the challenge response message may be transmitted from a user computing device to an access control server computer or a directory server computer. The challenge response message may contain authentication data in order to authenticate an account or payment device.

"Authentication data" may include any data suitable for authenticating a user or mobile device. Authentication data may be initially obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, biometric information of the user, phone numbers, IMEI numbers, etc.

A "token" may be a substitute value for a credential. A token may be a string of numbers, letters, or any other suitable characters. Examples of tokens include payment tokens, access tokens, personal identification tokens, etc.

A "token request indicator" may be value or flag that indicates a token is being requested.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider computer" can be any suitable device that that services tokens. In some embodiments, a token provider computer can facilitate requesting, determining (e.g., generating) and/or issuing tokens, as well as maintaining an established mapping of tokens to values (e.g., primary account numbers (PANs)) in a repository (e.g. token vault). The token provider computer may include or be in communication with a token vault where the generated tokens are stored. The token provider computer may support token processing of transactions (e.g., payment transactions) submitted using tokens by de-tokenizing the token to obtain the original value (e.g., the PAN). In some embodiments, any suitable component of a secure authentication system may assume the roles of the token provider computer. For example, directory server computers and/or access control server computers may become a token provider by implementing the token provider services of a token provider computer according to embodiments of the present invention.

A "token cryptogram" may include a token authentication verification value (TAVV) associated with a token. A token cryptogram may be a string of numbers, letters, or any other suitable characters, of any suitable length. In some embodiments, a token cryptogram may include encrypted token data associated with a token (e.g., a token domain, a token expiry date, etc.). A token cryptogram may be used to validate the token. For example, a token cryptogram may be used to validate that the token is being used within a token domain and/or by a token expiry date associated with the token.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and resource provider identifiers (e.g., merchant identifiers) to uniquely identify where the token can be used. A set of parameters (i.e. token domain restriction controls) may be established as part of token issuance by the token service provider that may allow for enforcing appropriate usage of the token in transactions. For example, the token domain restriction controls may restrict the use of the token with particular presentment modes, such as contactless or e-commerce presentment modes. In some embodiments, the token domain restriction controls may restrict the use of the token at a particular resource provider (e.g., a merchant) that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiration date may be a numeric value (e.g. a 4-digit numeric value). In some embodiments, the token expiry date can be expressed as a time duration as measured from the time of issuance.

A "token request message" may be a message for requesting a token and/or a cryptogram. If the token request message is used to request only a cryptogram, it may be referred to as a "cryptogram request message." A token request message may include a token requestor identifier associated with a token requestor (e.g., a directory server computer, a resource provider entity/computer, an authorizing entity/computer, or any suitable requestor). A token request message may include the payment credentials, which may be encrypted. A token request message may also include transaction data, a cryptogram, and a digital certificate (e.g., which may be signed by a key held by the token requestor), and/or any other suitable information. In some embodiments, the token request message may have an indication that it was sent by the resource provider computer on behalf of the user, and may include any suitable user information.

A "token response message" may be a message that responds to a token token request message. If the token response message is used to respond only to a cryptogram request, it may be referred to as a "cryptogram response message." A token response message may include a token requestor identifier associated with a token requestor (e.g., a directory server computer, a resource provider entity/computer, an authorizing entity/computer, or any suitable requestor) and a token and/or a token cryptogram.

A "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol).

An "authentication request message" may include a message sent as part of an authentication process. The authentication request message may request an authentication process be performed for a user, a user computing device, or a payment device.

An "authentication response message" may include a message sent as part of an authentication process in response to an authentication request message. An authentication response message may include the results of an authentication process based on data received in the authentication request message.

A "payment device" may include a device that can be used to perform a payment transaction. Payment device may be linked to a financial account associated with the holder of the payment device, and may be useable to provide payment information for a transaction. Payment devices can include debit devices (e.g., a debit card), credit devices (e.g., a credit card), or stored value devices (e.g., a pre-paid or stored value cards). Payment devices can also include mobile phones, tablet computers, personal digital assistants (PDAs), portable computers, smart cards, and the like. Other payment devices may include non-physical forms of payment (e.g., virtual wallets, virtual accounts).

A "verification value" may be a value or a token that indicates successful authentication. A "verification value" may in the form of a digital signature. The digital signature may be a cryptogram that is generated after a computer such as an access control server signs transaction data with a key (e.g., a private or a symmetric key). An example of a verification value is a cardholder authentication verification value, or CAVV, that may be provided by an issuer associated with a payment device upon authentication of the payment device. The verification value may be used in processing a payment authorization for a financial transaction as proof that an issuer or other authorizing entity authenticated a user.

An "authorization request message" may be an electronic message that is sent to a transaction processing computer and/or an authorizing entity computer (e.g., issuer of a payment card) to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an authorizing entity computer or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that an authorizing entity (e.g., an issuer bank) returns in response to an authorization request message in an electronic message (either directly or through the transaction processing computer) to a resource provider computer that indicates approval of the transaction. The code may serve as proof of authorization. In some embodiments, a transaction processing computer may generate or forward the authorization response message to the resource provider.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram of a system 100 according to an embodiment of the invention. The system 100 may be used to facilitate data communications between the various computers depicted in FIG. 1 for authentication and/or authorizing financial and non-financial transactions. The system 100 includes a user computing device 102, a service provider computer 104, a resource provider computer 108, a directory server computer 110, an authorizing entity computer 112, a token provider computer, a transport computer 116, and a transaction processing computer 118. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user computing device 102 may be in any suitable form. For example, the user computing device 102 may be hand-held and compact so that they can fit into a user's pocket. Examples of a user computing device 102 may include any device capable of accessing the Internet. Specific examples of a user computing device 102 may include cellular or wireless phones (e.g., smartphones), tablet phones, tablet computers, laptop computers, desktop computers, personal digital assistants (PDAs), pagers, portable computers, smart cards, and the like.

The user computing device 102 may include a processor, memory, input/output devices, and a computer readable medium coupled to the processor. The computer readable medium may comprise code, executable by the processor for performing the functionality described below. The user computing device 102 may include a browser and/or applications (e.g., the browser application 102A, application 102B, etc.) stored in the memory and configured to retrieve, present, and send data across a communications network (e.g., the Internet).

The user computing device 102 may be configured to send data (e.g., utilizing browser application 102A and/or application 102B) to any suitable destination (e.g., service provider computer 104) as part of a transaction request message. The data may include user computing device data, user-specific data, transaction data, or any suitable data. In some examples, the data may also include payment device data, geolocation data, user address, user email address, user phone number, account data, or other comparable data. In some embodiments, the browser application 102A or the application 102B used in the transaction may determine the particular data to be sent in an authentication request message. In some embodiments, the data that is sent in the authentication request message may be based on a resource provider category code for the resource provider in the transaction. For example, if the resource provider is a car rental agency, the number of days being reserved may be specifically sent as part of the transaction data in an authentication request message. In other embodiments, the data sent in the authentication request message may be dynamically determined based on the transaction data, the user-specific data, and the user computing device data.

The service provider computer 104 may be one or more computers provided by a resource provider (e.g., a merchant). In some embodiments, the service provider computer 104 may manage and provide services to a user via browser application 102A and/or an application associated with the service provider computer 104 (e.g., application 102B). The service provider computer 104 may be configured to send over-the-air (OTA) messages to the browser application 102A and/or the application 102B. In at least one example, the service provider computer 104 may be responsible for providing one or more network pages associated with the resource provider. This website may be configured to be accessible from an application (e.g., the browser application 102A, the application 102B, etc.) operating on the user computing device 102. The application 102B may be configured to receive and transmit transaction request/response messages using one or more service calls. The service provider computer 104 may be configured to handle service call requests from an application operating on the user computing device 102 (e.g., the browser application 102A and/or the application 102B). The service provider computer 104 may serve, in response to received requests, various user interfaces that may be rendered at the user computing device 102 (e.g., via the browser application 102A, the application 102B, etc.).

The service provider computer 104 may transmit and/or receive data through a communications medium to the user computing device 102, the resource provider computer 108, and/or the access control server computer 112A. The service provider computer 104 can be a large mainframe, a mini-computer cluster, or a group of servers functioning as a unit. In one example, the service provider computer 104 may be a database server coupled to a Web server.

The resource provider computer 108 may include any suitable computational apparatus operated by a resource provider. The resource provider computer 108 may include a processor and a computer readable medium coupled to the processor, the computer readable medium comprising code, executable by the processor for performing the functionality described herein. Examples of resource provider computer 108 may include an access device or a point of sale device. In some embodiments, the resource provider computer 108 may include a web server computer that may host one or more websites associated with the resource provider. Thus, the resource provider computer 108 may perform the functions described above in connection with the service provider computer 104. The resource provider computer 108 may be in any suitable form. Additional examples of a resource provider computer 108 include any device capable of accessing the Internet, such as a personal computer, cellular or wireless phones, personal digital assistants (PDAs), tablet computers, and handheld specialized readers.

In some embodiments, the resource provider computer 108 may be configured to send data to an access control server computer 112A via a directory server computer 110 as part of a authentication process for a transaction between the user (e.g., consumer) and the merchant. The resource provider computer 108 may also be configured to generate authorization request messages for transactions between the resource provider and a user, and route the authorization request messages to an authorizing entity computer 112 for additional transaction processing. In some embodiments, the messages sent by the resource provider computer 108 may be sent by a resource provider plug-in module 108A, which may function as a proxy between the resource provider computer 108 and the access control server computer 112A or other components within the system.

In some embodiments, the resource provider computer 108 may transmit data through a communications medium to a transport computer 116 as part of an authorization process for a transaction. In some embodiments of the invention, the resource provider computer 108 may receive transaction data from user computing device 102 and transmit the transaction data to the transport computer 116 for transaction-related processes (e.g., authorization) in an authorization request message. In such embodiments, the authorization request message may include a verification value generated in the secure authentication process by the access control server computer 112A.

The directory server computer 110 may be a server computer configured to route messages between two computers. For example, the directory server computer 110 may route messages between the resource provider computer 108 and the access control server computer 112A. In some embodiments, the directory server computer 106 may route authentication request/response messages between the resource provider computer 108 (or resource provider plug-in module 108A) and the access control server computer 112A as part of a financial or non-financial transaction. In some embodiments, the directory server computer 106 may be operated by transaction processing computer 118.

In some embodiments, the directory server computer 110 may be configured to perform an enrollment verification process on behalf of the access control server computer 112A. In such embodiments, the directory server computer 110 may store data regarding accounts or account identifiers that are enrolled in the secure authentication program.

The authorizing entity computer 112 is typically associated with a business entity (e.g., a bank) which issues and maintains consumer accounts for a consumer. The authorizing entity computer 112 may issue payment devices for user accounts (e.g., consumer accounts), including credit cards and debit cards, and/or may provide user accounts stored and accessible via the user computing device 102. The authorizing entity computer 112 may be configured to conduct authorization processes. The authorizing entity computer 112 may include an access control server computer 112A. In other embodiments, the access control server computer 112A may be separate and distinct from the authorizing entity computer 112.

The access control server computer 112A may comprise a server computer that may be configured to conduct authentication processes. The access control server computer 112A may be associated with an issuer, which can be an authorization entity (e.g., bank, financial institution) that issues and maintains financial accounts for a user. The access control server computer 112A may use user-specific data, user computing device data, transaction data, PAN, payment device data, geolocation data, account data, or other comparable data, in order to perform an authentication for the transaction. In some embodiments, at the time of a transaction, the access control server computer 112A may perform the authentication, and may provide an authentication response message to the resource provider computer 108 via the directory server computer 110. The authentication response message may provide an indication to the resource provider computer 108 that the account or user computing device has been authenticated or not authenticated. In other embodiments, the access control server computer 112A may be configured to send an authentication response message to the resource provider computer 108 directly via a direct connection. In some embodiments, the functions of the access control server computer 112A may be performed by the transaction processing computer 118 and/or the directory server computer 110 on behalf of an authorizing entity (e.g., an issue). In any example described herein, an authentication response message may be digitally signed by a component performing authentication operations (e.g., the access control server computer 112A).

The token provider computer 114 may include any suitable computational apparatus operated by a token provider. Token provider computer 114 may include a processor and a computer readable medium coupled to the processor, the computer readable medium comprising code, executable by the processor for performing the functionality described herein. Token provider computer 114 can facilitate generating, maintaining, and/or issuing (provisioning, transmitting, etc.) tokens and/or token cryptograms, as well as maintaining an established mapping of tokens to information associated with a user (e.g., a PAN, a token cryptogram, etc.) in a repository (e.g. a token vault). The token provider computer 114 may include or be in communication with a token vault (e.g., one or more data stores) where the generated tokens and/or token cryptograms are stored. The token provider computer 114 may support token processing of transactions submitted using tokens by de-tokenizing the token to obtain underlying data (e.g., the PAN). In some embodiments, the token provider computer 114 may be configured to send/receive data to/from the directory server computer 110 or any suitable component of FIG. 1 configured to request tokens and/or token cryptograms.

The transport computer 116 is typically associated with a business entity (e.g., a commercial bank) that has a business relationship with a particular resource provider (e.g., a merchant) or other entity and that may be involved in the process of conducting transaction. The transport computer 116 may issue and manage accounts for resource providers and exchange funds with the authorizing entity computer 112 on behalf of the resource provider. Some entities can perform both authorizing entity computer 112 and transport computer 116 functions. Embodiments of the present invention encompass such single entity issuer-acquirer computers.

The transaction processing computer 118 may include a network that includes or operates at least one server computer used for transaction processing (e.g., payment processing). The transaction processing computer 118 may include a processor and a computer readable medium coupled to the processor, the computer readable medium comprising code, executable by the processor for performing the functionality described herein. In some embodiments, the transaction processing computer 118 may be coupled to a database and may include any hardware, software, other logic, or combination of the preceding for servicing the requests from one or more client computers. The transaction processing computer 118 may comprise one or more computational apparatuses and may use any of a variety of computing structures, arrangements, and compilations for servicing the requests from one or more client computers. In some embodiments, the transaction processing computer 118 may operate multiple server computers. In such embodiments, each server computer may be configured to process transaction for a given region or handles transactions of a specific type based on transaction data.

The transaction processing computer 118 may include data processing subsystems, networks, and operations used to support and deliver authorization services, exception file services, and clearing and settlement services. An exemplary transaction processing computer 118 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The transaction processing computer 118 may use any suitable wired or wireless network, including the Internet.

The transaction processing computer 118 may be configured to process authorization request messages and determine the appropriate destination (e.g., authorizing entity computer 112) for the authorization request messages. The transaction processing computer 118 may be configured to process authorization response messages (e.g., from an authorization entity computer 112) and determine the appropriate destination (e.g., the transport computer 116) for the authorization response messages. The transaction processing computer 118 may also be configured to handle and/or facilitate the clearing and settlement of transactions.

Figure 2:
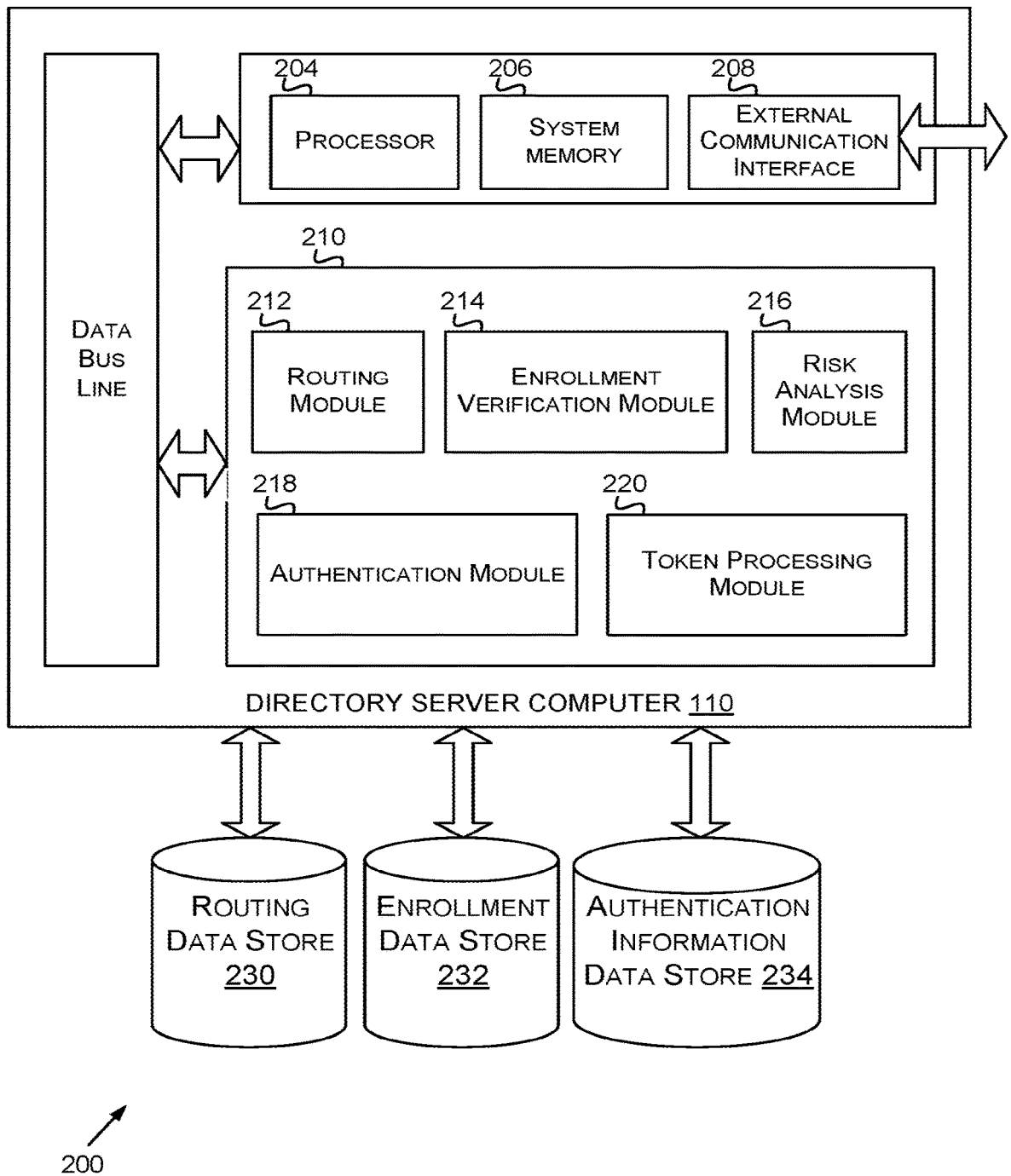
FIG. 2 shows a block diagram of a directory server computer according to some embodiments of the invention.

FIG. 2 shows a block diagram 200 of a directory server computer (e.g., directory server computer 110 of FIG. 1) according to some embodiments of the invention.

The directory server computer 110 may comprise a processor 204, which may be coupled to a system memory 206 and an external communication interface 208. A computer readable medium 210 may also be operatively coupled to the processor 204. Computer readable medium 210 may also comprise code for implementing the methods discussed herein.

The computer readable medium 210 may comprise a number of software modules including a routing module 212, an enrollment verification module 214, a risk analysis module 216, an authentication module 218, and a token processing module 220. Although these various modules are depicted as being internal to the directory server computer 110, any number of these modules may instead be implemented as separate systems external to the directory server computer 110.

The routing module 212 may comprise code that, when executed, can cause the processor 204 to receive an authentication request message (e.g., from resource provider computer 108 of FIG. 1 or a corresponding resource provider plug-in module 108A). Upon receipt of the authentication request message, or at another suitable time, the routing module 212 may cause the processor 204 to retrieve routing data from routing data store 230, a data store configured to store routing data associated with routing message and/or information between one or more entities (e.g., between a resource provider computer and an access control server computer). Although the routing data store 230 is depicted as external to the directory server computer 110, it should be appreciated that the routing data store 230 may be stored locally with respect to the directory server computer 110 (e.g., in system memory 206) and/or any suitable storage location accessible and/or communicatively coupled to the processor 204. The routing module 212 may be configured to cause the processor to route the authentication request message to a destination (e.g., the access control server computer 112A of FIG. 1) according to the obtained routing data.

The routing module 212 may further comprise code that, when executed, can cause the processor 204 to receive an authentication response message (e.g., from the access control server computer 112A). Upon receipt of the authentication response message, or at another suitable time, the routing module 212 may cause the processor 204 to retrieve routing data from routing data store 230 to identify a destination for the authentication response message (e.g., the resource provider computer 108 of FIG. 1). The routing module 212 may be configured to cause the processor 204 to transmit the authentication response message to the identified destination according to the obtained routing data.

The enrollment verification module 214 may comprise code that, when executed, can cause the processor 204 to access enrollment data to perform an enrollment verification process on behalf of an access control server computer (e.g., the access control server computer 112A). In such embodiments, the enrollment verification module 214 may be configured to cause the processor 204 to access previously-stored enrollment data to verify that the account associated with an authentication request message is enrolled in a secure authentication program. By way of example, the enrollment verification module 214 may cause the processor 204 to access enrollment data stored in the enrollment data store 232, a data store configured to store such information and accessible to the processor 204. If the account is not enrolled, the enrollment verification module 214 may be configured to cause the processor 204 to transmit an authentication response message indicating that the authentication request message was unsuccessful due to the lack of enrollment.

The risk analysis module 216 may comprise code that, when executed, can cause the processor 204 to perform a risk analysis using user-specific data, user computing device data, and/or transaction data received in an authentication request message. In such embodiments, the processor 204 may calculate a risk score for the transaction and transmit the risk score (e.g., to the access control server computer 112A) for additional authentication processing.

In some embodiments, the authentication module 218 may comprise code that, when executed, causes the processor 204 to conduct a challenge process with the user computing device 102. In such embodiments, the authentication module 218 may be configured to cause the processor 204 to generate a challenge request message requesting a user provide a pre-established secure data element (e.g., password, token, biometric data) in order to authenticate the transaction and/or the payment device. The processor 204 may be configured to transmit the challenge request message to a user computing device and receive a challenge response message from the user computing device corresponding to the request. In such embodiments, the authentication module 218 may be configured to cause the processor 204 to evaluate a secure data element (e.g., a password, a PIN, authentication data, etc.) received in a challenge response message and determine whether the received secure data element matches a stored secure data element. By way of example, the authentication module 218 may cause the processor 204 to access authentication data (e.g., the secure data element) stored in the authentication information data store 234, a data store configured to store such information and accessible to the processor 204.

Although depicted as functionality performed with respect to the directory server computer 110, it should be appreciated that in some embodiments functionality related to enrollment, risk analysis, and sending/receiving challenge request/response messages may be additionally, or alternatively, performed by an access control server computer (e.g., the access control server computer 112A).

In some embodiments, the token processing module 220 may comprise code that, when executed, causes the processor 204 to transmit a token request message and/or a cryptogram request message to a token provider (e.g., the token provider computer 114 of FIG. 1). In at least one embodiment, the token processing module 220 may further comprise code that causes the processor 204 to receive a token response message and/or a cryptogram response message. In at least one embodiment, the token processing module 220 may perform one or more of the functions described in connection with the token provider computer 114 described in connection with FIG. 3.

Figure 3:
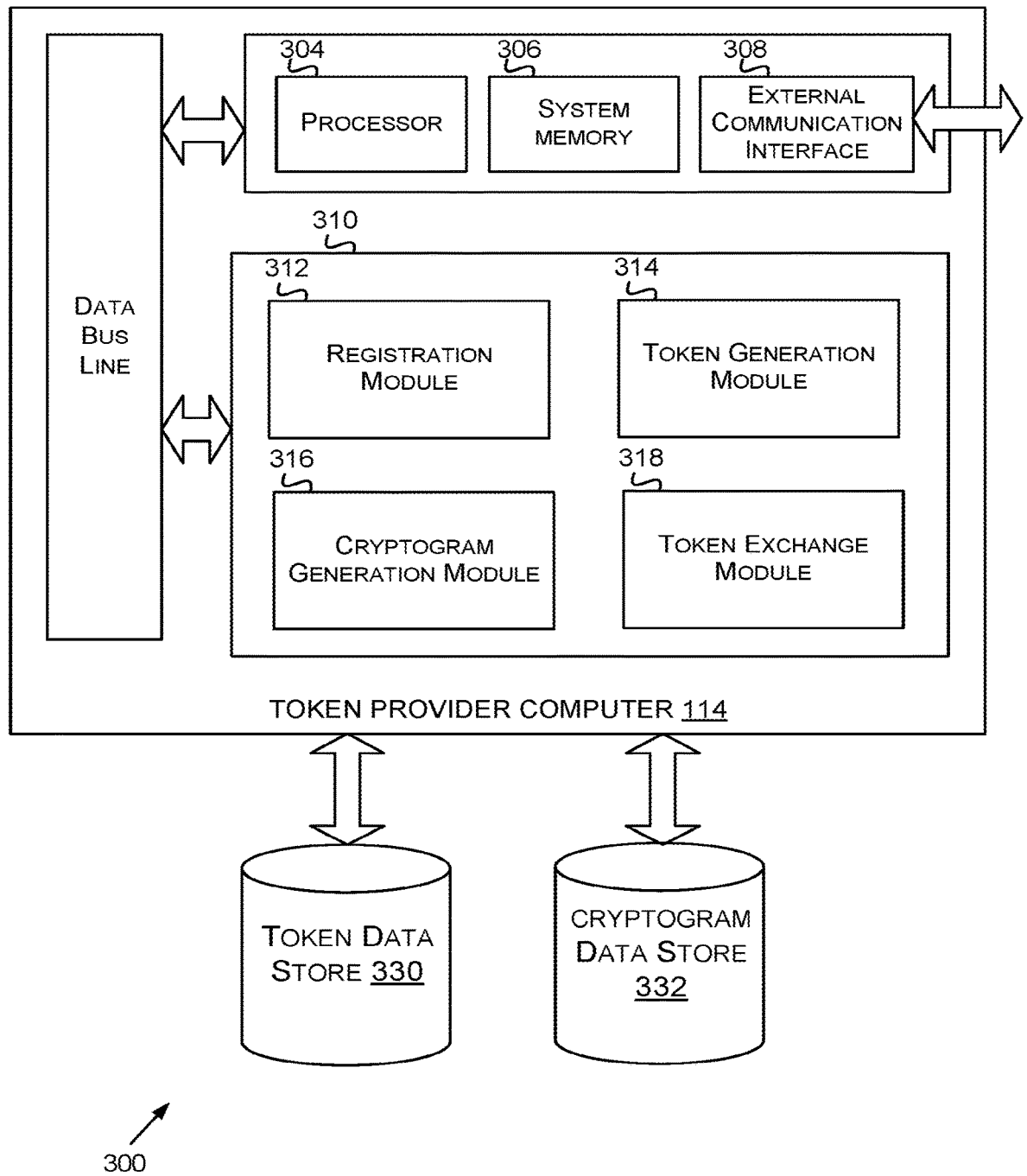
FIG. 3 shows a block diagram of a token provider computer according to some embodiments of the invention.

FIG. 3 shows a block diagram 300 of a token provider computer (e.g., token provider computer 114 of FIG. 1) according to an embodiment of the invention.

The token provider computer 114 may comprise a processor 304, which may be coupled to a system memory 306 and an external communication interface 308. A computer readable medium 310 may also be operatively coupled to the processor 304. Computer readable medium 310 may also comprise code for implementing the methods discussed herein.

The computer readable medium 310 may comprise a number of software modules including a registration module 312, a token generation module 314, a cryptogram generation module 316, and a token exchange module 318. Although these various modules are depicted as being internal to the token provider computer 114, any number of these modules may instead be implemented as separate systems external to the token provider computer 114.

The registration module 312 may comprise code which can cause the processor 304 to register a token requestor entity with a token data store 330 and to generate a token requestor identifier for the registered entity. Some non-limiting examples of the token requestor entities may include authorizing entities (e.g., issuers), resource providers (e.g., merchants, e-commerce merchants, transit authorities, etc.), directory server computers, transaction processors (e.g., transaction processing computers), transport providers (e.g., acquirers), user computing devices, or subcomponents and applications thereof.

The registration module 312 may be configured to cause the processor 304 to receive registration information such as an entity name, contact information, an entity type (e.g., user, directory server computer, resource provider, service provider, transaction processor, authorizing entity, transport entity, etc.), and any other relevant information for token generation processing. In some examples, registration module 312 may be configured to cause the processor 304 to provide one or more interfaces for collecting registration information. Such interfaces may be provided by the processor 304 and rendered via an application and/or website managed by the processor 304 as part of the functionality of registration module 312. In some embodiments, the registration module 312 may cause the processor 304 to validate the information and store the token requestor details in the token data store 330. The registration module 312 may also generate a token requestor ID after successful registration. In some embodiments, the token requestor ID may be a ten digit numerical value. However, other formats of the token requestor identifier are possible. The registration module 312 may further be configured to transmit the token requestor ID to the token requestor.

The token generation module 314 may be configured to cause the processor 304 generate a token in response to a token request message from a token requestor (e.g., directory server computer 110 on behalf of the resource provider computer 108). In one embodiment, the token generation module 314 may cause the processor 304 to receive a token request message (e.g., a message including a token requestor ID, an account number (e.g., PAN), an expiration date, a CVV2, etc.). In some embodiments, the token generation module 314 may cause the processor 304 to validate the token requestor ID and generate a token (e.g., a token for the PAN). In one embodiment, the token generation module 314 may cause the processor 304 to generate a token response message including the generated token. The token data store 330 may be utilized by the processor 304 to maintain a correlation (e.g., a mapping) between an account number (e.g., a PAN), a token requestor ID, and a token. In one embodiment, the token generation module 314 may determine if a token already exists in the token data store 330 for the account number associated with the token requestor ID before generating a new token. In some embodiments, if a token cannot be generated, a token response message may be transmitted by the processor 304 to the requestor (e.g., a directory server computer, a resource provider computer, etc.) indicating a reason the token cannot be generated.

The cryptogram generation module 316 may be configured to cause the processor 304 to receive a cryptogram request message from a cryptogram requestor (e.g., a directory server computer, a resource provider computer, etc.). The cryptogram generation module 316 may be configured to cause the processor 304 to generate a token cryptogram (e.g., a TAVV) corresponding to the cryptogram request message. The cryptogram generation module 316 may be configured to cause to the processor 304 to generate a cryptogram response message including the generated cryptogram. The cryptogram data store 332 may be utilized by the processor 304 to maintain a correlation (e.g., a mapping) between a cryptogram requestor ID, a token, and the cryptogram, or any suitable combination of the above. In some embodiments, if a cryptogram cannot be generated, the cryptogram response message may be transmitted by the processor 304 to the cryptogram requestor indicating a reason the cryptogram could not be generated. In at least one embodiment, the functionality of the cryptogram generation module 216 may be induced by executing code of the token generation module 314.

In some embodiments, a token and token cryptogram may be generated/provisioned as a result of a single token request message. In still further embodiments, a token and a token cryptogram may be maintained in a single data store in a common record/association. For example, instead of separate mappings, a single mapping including account information, a token, a token cryptogram, an account identifier (e.g., a PAN), and a token requestor ID may be maintained by the processor 304.

The token exchange module 318 may comprise code, executable by the processor 304, to cause the processor 304 to allow registered entities to request account information (e.g., a PAN) for a given token. For example, the transaction processing computer 118 of FIG. 1 may issue a request for a token exchange during a transaction authorization process. In one embodiment, a registered entity can provide a token requestor ID and a token, or any suitable information to request the account information associated with the token. The token exchange module 318 may validate that the requesting entity is entitled to make a request for a token exchange. In one embodiment, the token exchange module 318 may be configured to cause the processor to validate the account information/token mapping (e.g., a PAN to token mapping). Upon successful validation, the token exchange module 318 may be configured to cause the processor 304 to retrieve the account information (e.g., the PAN) and provide it to the requesting entity. In one embodiment, if the account information/token mapping is not valid, an error message may be provided.

Figure 4:
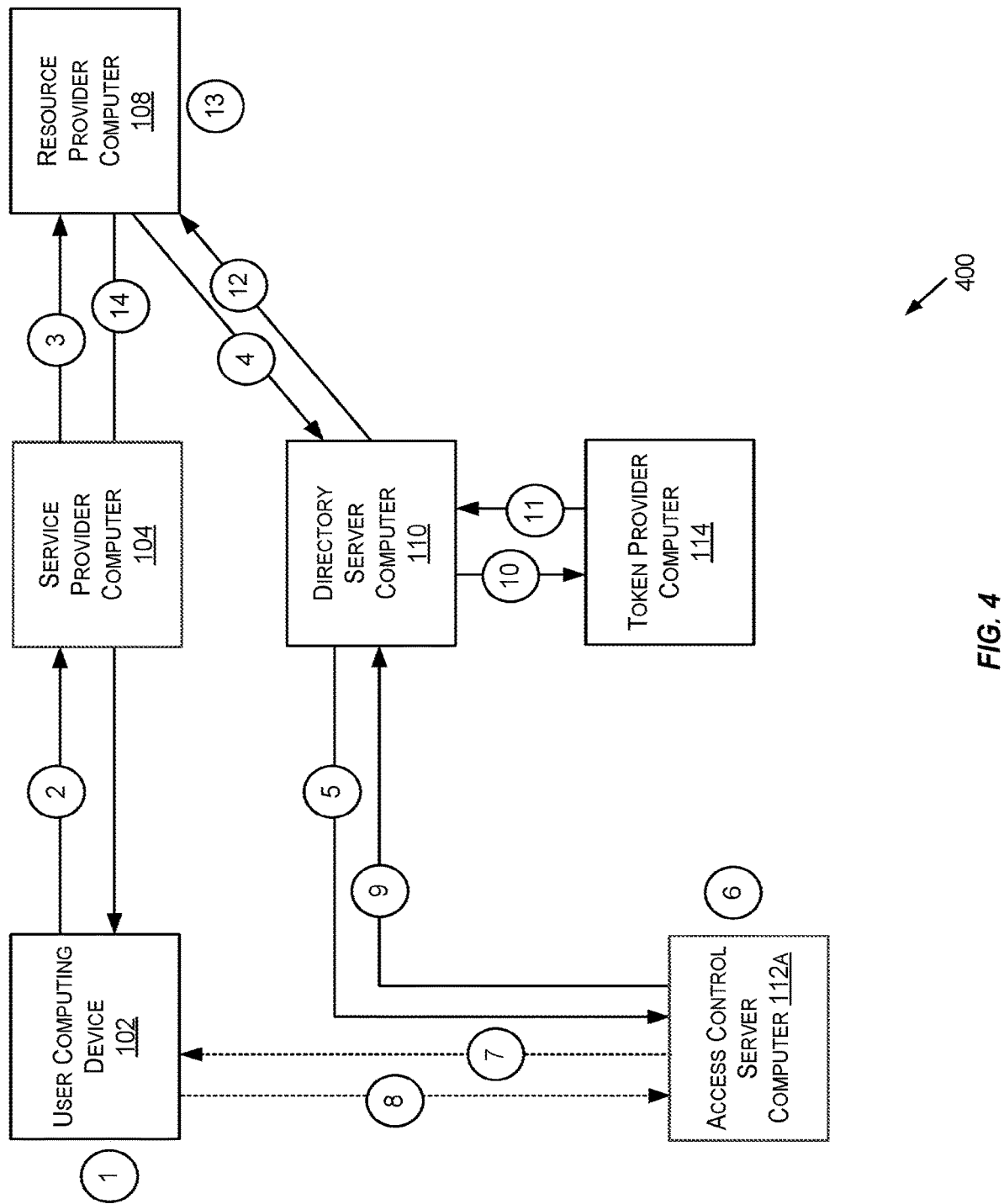
FIG. 4 shows a flow diagram of a method of provisioning a token within a secure authentication system according to some embodiments of the invention.

FIG. 4 shows a flow diagram of a method 400 of provisioning a token within a secure authentication system according to some embodiments of the invention.

The method may begin at step 1, where a user initiates a transaction. In some embodiments, the user may access an application stored on the user computing device 102 (e.g., browser application 102A or application 102B of FIG. 1) in order to initiate a transaction. The application may be associated with a service provider computer 104 operating a website on behalf of a resource provider. When the user has selected goods or services via the application, the user may proceed to a checkout process for the transaction. For example, the user may select a "Buy" or "Checkout" option presented on a display of the user computing device 102.

At step 2, the application on the user computing device 102 generates and sends a transaction request message to the service provider computer 104. In some embodiments, the transaction request message may include transaction data (including user-specific data and/or user computer device data) corresponding to the transaction initiated at step 1.

At step 3, the service provider computer 104 may forward the transaction request message to the resource provider computer 108 for processing. At step 4, in response to receiving the transaction request message, the resource provider computer 108 may be configured to generate and send an authentication request message to a directory server computer 110. The authentication request message may be sent over a secure connection by the resource provider computer 108 to the directory server computer 110. In at least some embodiments, the authentication request message may be sent by a resource provider plug-in module (e.g., resource provider plug-in module 108A) of the resource provider computer 108.

The data sent in the authentication request message may include user computing device data (e.g., operating system data, browser data, mobile application data, geo-location data), user-specific data (e.g., user name, user address data, user email address, user phone number), and/or other transaction data (e.g., shopping cart data, payment device data, payment account number), and/or other comparable data. In some embodiments, the authentication request message may include a token request indicator indicating that a token is being requested. The token request indicator may be in the form of a flag or code comprising any suitable number or type of characters.

In some embodiments, the application stored on the user computing device 102 and/or the service provider computer 104 may store all the data for the resource provider within the application, and accessing the resource provider computer 108 may not be required. In such embodiments of the present invention, software and data libraries associated with the secure authentication process may be integrated into the application stored on the user computing device 102 and/or integrated into the service provider computer 104. In such embodiments, the software, application programming interfaces, and data libraries may enable the application and/or the service provider computer 104 to generate and format the authentication request message to perform the secure authentication process with the access control server computer 112A via the directory server computer 110. An application (e.g., the browser application 102A and/or application 102B) may also store software components for the resource provider plug-in module 108A, which may act as a proxy for re-directing the user computing device 102 to a web address (or URL) associated with the directory server computer 110 and/or the access control server computer 112A. Thus, in some embodiments, the authentication request message generated at step 4 may be generated and transmitted to the directory server computer 110 by the service provider computer 104 or the user computing device 102.

At step 5, the directory server computer 110 may identify and route the authentication request message to an appropriate access control server computer 112A associated with the received transaction data (e.g., payment device data, payment account number). In some embodiments, the directory server computer 110 may evaluate the data received in the authentication request message to identify a particular access control server computer (e.g., access control server computer 112A) to which the authentication request message will be routed.

At step 6, the access control server computer 112A may receive the authentication request message from the directory server computer 110. The access control server computer 112A may then optionally perform an enrollment verification process and/or a risk analysis using the data received in the authentication request message.

In some embodiments, as part of the enrollment verification process, the access control server computer 112A may determine whether an account identifier (e.g., an account number) has been previously enrolled in the secure authentication program provided by the access control server computer 112A. The access control server computer 112A may contain or have access to a database that stores enrolled account identifiers. In some embodiments, when the account identifier is not enrolled in the secure authentication program, the access control server computer 112A may not perform an authentication for the transaction and return an authentication response message to the resource provider computer 108 via the directory server computer 110 indicating that no authentication process was performed.

In some embodiments, when the account identifier is enrolled in the secure authentication program, the access control server computer 112A may perform a risk analysis using the user-specific data, user computing device data, and transaction data received in the authentication request message. In some embodiments, the risk analysis may include analyzing previous transactions associated with the payment device, an account identifier, and/or the user computing device data. In some embodiments, the risk analysis may return a risk score associated with the transaction. The access control server computer 112A may evaluate the risk score against a pre-established risk threshold.

When the risk score is on a first side of the threshold (e.g., below the threshold), the transaction may be deemed to be low risk. In such situations, the access control server computer 112A may not require any interaction with the user or the user computing device 102 for additional authentication data. For example, where the risk score indicates that the transaction is low risk, steps 7 and 8 may not be required.

However, when the risk score is on a second side of the threshold (e.g., above the threshold), the transaction may be deemed to be high risk. In such situation, the access control server computer 112A may require additional data from the user associated with the user computing device 102 in order to authenticate the transaction. By way of example, when the risk score is determined to be high risk, the process may continue to step 7 for further authentication processes (e.g., a challenge process).

In some embodiments, the enrollment verification process and the risk analysis using the data received in the authentication request message may be additionally, or alternatively, performed by the directory server computer 106 on behalf of the access control server computer 112A. In some embodiments, the risk score determined by the risk analysis by the directory server computer 110 may then be sent to the access control server computer 112A for further authentication operations.

In step 7, when the access control server computer 112A requires additional data to authenticate the transaction, the access control server computer 112A may initiate a challenge process with the user. The access control server computer 112A may generate and send a challenge request message to the user computing device 102. The challenge request message may request that the user associated with the user computing device provide a pre-established secure data element (e.g., password, token or biometric data). The challenge request message may be presented to the user on the display of the user computing device as a web interface sent across a communications network (e.g., Internet), or may be sent to the consumer via other types of communications (e.g., SMS messaging, email messaging). In some embodiments, the challenge request message may be sent directly from the access control server computer 112A to the user computing device 102. In other embodiments, the challenge request message may be sent to the user computing device 102 through the directory server computer 110 and/or the service provider computer 104. The challenge request message may be sent through the secure connection established by an application operating on the user computing device 102 (e.g., the browser application 102A and/or the application 102B).

In step 8, the user computing device 102 returns a challenge response message to the access control server computer 112A. The challenge response message may include the secure data element (e.g., authentication data) requested by the access control server computer 112A in the challenge request message. In some embodiments, the challenge response message may be sent directly to the access control server computer 112A from the user computing device 102. In other embodiments, the challenge response message may be sent from the user computing device 102 to the access control server computer 112A through the service provider computer 104 and/or the directory server computer 110. The access control server computer 112A may evaluate the received secure data element against a pre-established secure data element stored by, or accessible to, the access control server computer 112A. When the received secure data element and the stored secure data element match or are within an expected range, the transaction may be authenticated.

In some embodiments, steps 7 and 8 may be repeated until either the number of times the secure data element can be requested from the user computing device 102 is exceeded, the access control server computer 112A successfully authenticates the user and generates the verification value, or the authentication is determined to be unsuccessful and the access control server computer 112A generates the authentication response message indicating a failed authentication. By way of example, when the received secure data element and the stored secure data element do not match or are not within an expected range, the access control server computer 112A may generate and transmit an authentication response message to the resource provider computer 108 via the directory server computer 110 that indicates that authentication has failed. Receipt of an authentication response message indicating that the authentication has failed may cause the resource provider computer 108 to transmit a transaction response message to the user computer device 102 via the service provider computer 104 indicating that the transaction has failed and further processing by the resource provider computer 108 may not be performed.

In step 9, the access control server computer 112A may generate and send an authentication response message to the directory server computer 110. The generated authentication response message may include a verification value for the transaction generated in response to a successful authentication. In some embodiments, the verification value may be a card authentication verification value ("CAVV"). This value can be a cryptogram that has any suitable number of characters (e.g., 3-10). In at least one embodiment, the authentication response message may include user-specific data provided by the access control server computer 112A which was not included in the received authentication request message. By including such user-specific data, the access control server computer 112A may provide information to the directory server computer 110 and/or the resource provider computer 108 (directly, or via the directory server computer 110) that was not otherwise available to the directory server computer 110 and/or resource provider computer 108. The user-specific data may be utilized by the directory server computer 110 and/or the resource provider computer 108 for any suitable purpose including, but not limited to fraud detection, marketing, authentication, or the like.

At step 10, the directory server computer 110 may generate and transmit a token request message to token provider computer 114 in response to receiving the authentication response message corresponding to a authentication request message for which a token requestor indicator was included indicating that a token was being requested. The token request message may include a token requestor identifier (e.g., corresponding to the directory server computer 110, the resource provider computer 108, etc.) and transaction data (e.g., a PAN) received in the authentication request message.

At step 11, a token provider computer 114 may generate, store, and transmit a token in a token response message to the directory server computer 110. In some embodiments, the token provider computer 114 may maintain a mapping between transaction data (e.g., the PAN), the generated token, and the token requestor (e.g., the directory server computer 110, the resource provider computer 108, etc.). In some embodiments, the token generated may be shared by all resource providers serviced by the directory server computer 110. In other embodiments, the token may be generated for a particular resource provider serviced by the directory server computer 110. In some embodiments, the token provider computer 114 may be configured to generate a cryptogram in response to generating a token. The generated cryptogram may be stored in the mapping.

In some embodiments, limits may be placed on the generated token. For example, a token domain and/or a token expiration date may be configured such that the token may only be usable in a certain area (e.g. based on geo-location data), at the resource provider computer 108 (e.g. based on a merchant ID), for the amount of the current transaction, and/or for a certain time period. Additionally, or alternatively, the token may be a one-time use token, and it may only be eligible for the current transaction. In some embodiments, the token may be utilized for a purchase immediately after being requested, and accordingly it may be assigned a short lifespan (e.g., it may have an expiration time in the near future). For example, the token may only be valid for 1 hour, 10 minutes, 5 minutes, 1 minute, 30 seconds, or any other suitable amount of time. In some embodiments, the generated cryptogram may include one or more token limitations/restrictions. The limitations/restrictions may be encrypted within the cryptogram.

In some embodiments, steps 10 and 11 may be conducted prior to the directory server computer 110 forwarding the authentication request message to the access control server computer 112A in step 5.

At step 12, the directory server computer 110 may transmit the authentication response message including the generated token and any suitable user-specific data provided by the access control server computer 112A to the resource provider computer 108. The authentication response message may be transmitted directly to the resource provider computer 108, or via the resource provider plug-in module 108A of FIG. 1. The direct connection may be a wired or wireless communications connection. In some embodiments, a generated cryptogram corresponding to the token may be included in the authentication response message.

At step 13, the resource provider computer 108 may receive the authentication response message including the verification value from the directory server computer 110. In embodiments where a cryptogram has not been provided, the resource provider computer 108 may then conduct a cryptogram request process discussed further in connection with FIG. 5. In some embodiments, the resource provider computer 108 may proceed to conduct an authorization process discussed further in connection with FIG. 6.

At step 14, the resource provider computer 108 may transmit a transaction response message to the service provider computer 104. The service provider computer 104 may then forward the transaction response message to the user computing device 102 (e.g., via browser application 102A or application 102B). The transaction response message may indicate that the authentication transaction was successful or unsuccessful. In some embodiments, transmitting the transaction response message may be dependent on completion of a cryptogram request process described in connection with FIG. 5 and/or an authorization process described in connection with FIG. 6.

It is understood that the flow may be different in other embodiments. For example, the authentication request and response messages may pass between the resource provider computer 108 and the access control computer 112A via the user computing device 102 instead of the directory server computer 110.

The embodiment described in FIG. 4 may include authenticating both financial and non-financial transactions. In the case of non-financial transactions, the process may be completed when the user computing device 102 receives the transaction response message from the service provider computer 104, as an authorization process may not be required. In some embodiments, a cryptogram request process need not be conducted prior to completing the process described in connection to FIG. 4.

Figure 5:
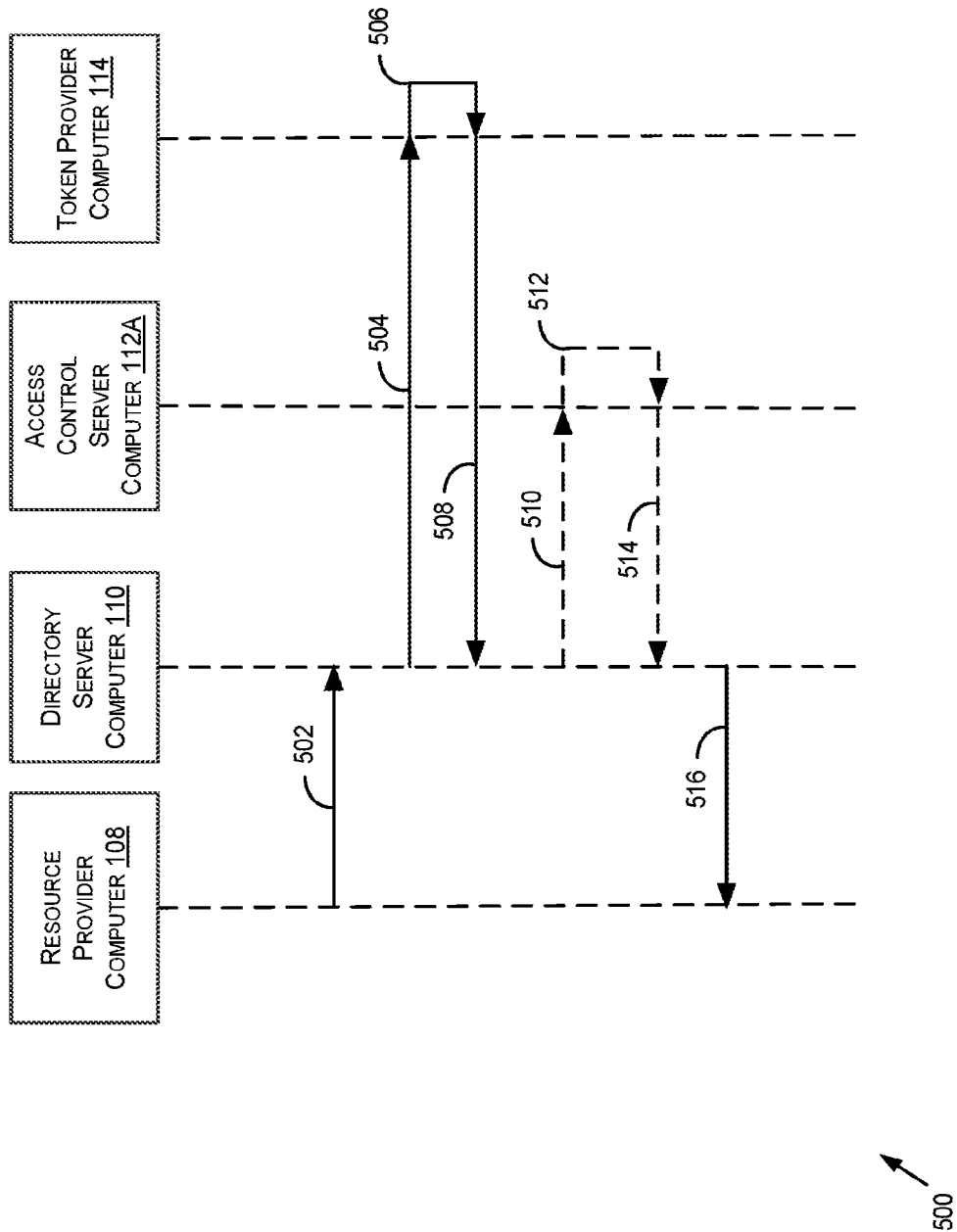
FIG. 5 shows a flow diagram of a method of provisioning a token cryptogram within a secure authentication system according to some embodiments of the invention.

FIG. 5 shows a flow diagram of a method 500 of provisioning a token cryptogram within a secure authentication system according to some embodiments of the invention.

The method may begin at 502, where the resource provider computer 108 may be configured to send a cryptogram request message to the directory server computer 110. The cryptogram request message may include a token requestor ID associated with the resource provider, a previously provisioned token, or any suitable information related to requesting a token cryptogram. It should be appreciated that although the method of 500 depicts transmission of a cryptogram request message to initiate token cryptogram generation, a token cryptogram may instead be generated at a same time as a token during the authentication process described in FIG. 4. Thus, a token cryptogram may be generated and provisioned (e.g., to the directory server computer 110, the resource provider computer 108, or other suitable token requestor) by a token provider computer 114 in response to receipt of a token request message (e.g., from the directory server computer 110).

At 504, the directory server computer 110 may transmit the cryptogram request message to the token provider computer 114. The token provider computer 114 (or a module of the token provider computer 114 such as the cryptogram generation module 316 of FIG. 3) may be configured to generate a token cryptogram at 506. The token cryptogram may include information related to the token such as a token domain and/or a token expiry date. In some embodiments, the token cryptogram may be used to verify that the token is being used in conformance with restrictions associated with the token. The token provider computer 114 may store the token cryptogram as an association with the token and the token requestor ID. The token provider computer 114 may then send a cryptogram response message to the directory server computer 110 at 508.

In some embodiments, as part of the method 500, the directory server computer 110 may transmit a data request message to the access control server computer 112A requesting current user-specific data at 510. The data request message may be formatted according to any suitable protocol. For example, the data request message may be formatted as an authentication request message with an indicator specifying that authentication processes should not occur and/or that current user-specific data is requested only.

At 512, the access control server computer 112A may receive the data request message and obtain current user-specific data for the user/user computing device. At 514, the access control server computer 112A may transmit a data response message to the data requestor (e.g., the directory server computer 110). The data response message may include the user-specific data provided by the access control server computer 112A. The data response message may be formatted according to any suitable protocol. For example, the data response message may be formatted as an authentication response message with an indicator specifying that message is providing current user-specific data. It should be appreciated that in some embodiments, steps 510-514 are not performed.

Although data is requested from the access control server computer 112A as part of the method 500, it should be appreciated that the directory server computer 110 (or any component of the system 100) may transmit a data request message to the access control server computer 112A requesting current user-specific data. A data response message including current user-specific data may be provided by the access control server computer 112A in response to the data request.

At 516, the directory server computer 110 may transmit a cryptogram response message to the resource provider computer 108. The cryptogram response message may include the generated cryptogram and any suitable user-specific information obtained from the access control server computer 112A.

Figure 6:
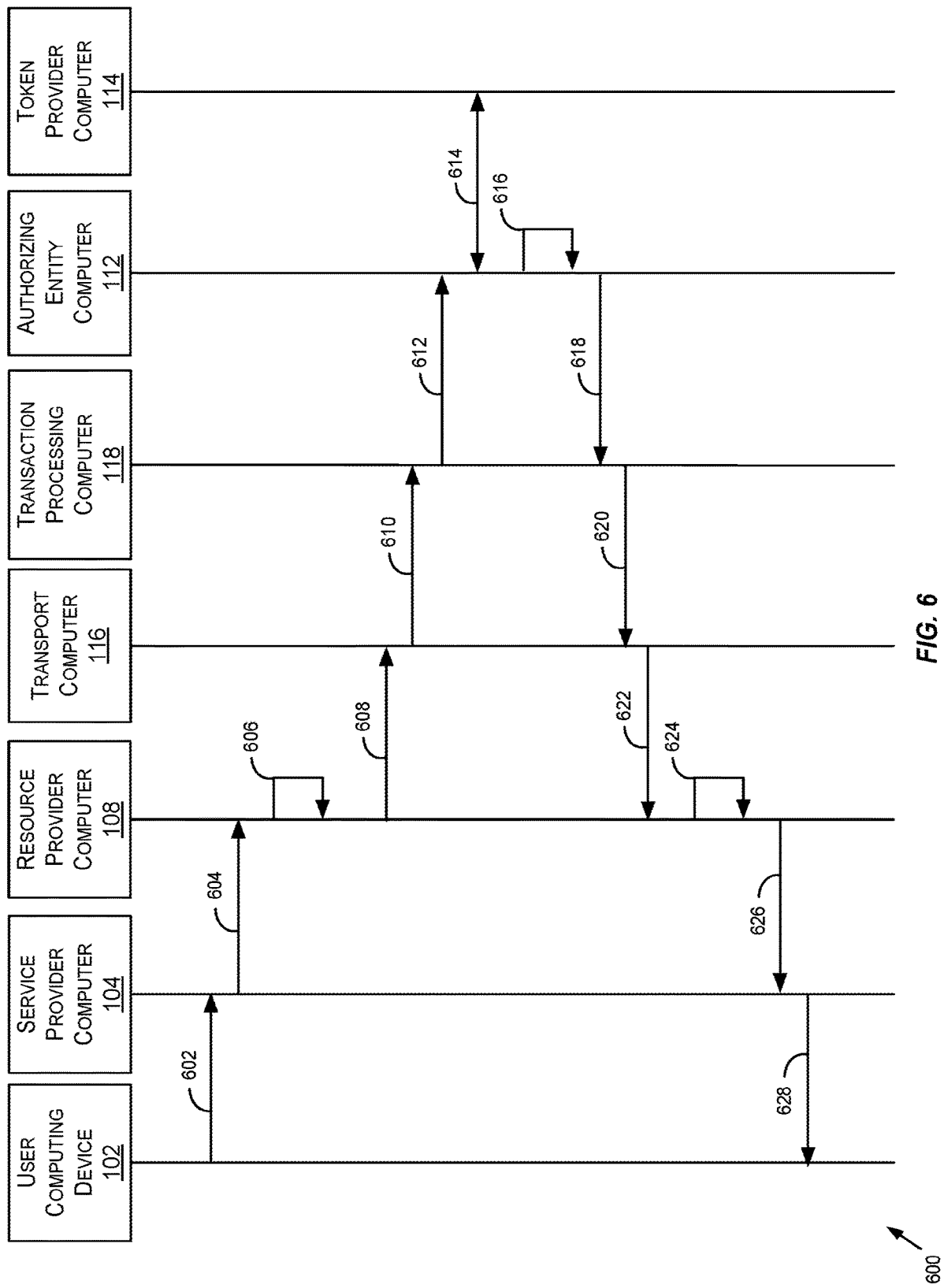
FIG. 6 shows a flow diagram of a method of performing a transaction according to some embodiments of the invention.

FIG. 6 shows a flow diagram of a method 600 of performing a transaction according to some embodiments of the invention. The steps shown in the method 600 may be performed sequentially or in any suitable order in embodiments of the invention. In some embodiments, one or more of the steps may be optional.

The user may wish to purchase a good or service from the resource provider. At 602, in order to perform the purchase, the user may provide payment credentials (e.g. via a transaction request message) to the service provider computer 104 (e.g., via the browser application 102A and/or the application 102B operating on the user computing device 102 of FIG. 1). For example, in some embodiments, the user may provide a PAN, a security code, an expiration date, a name, an address, a phone number, and/or any other suitable payment credentials via a website hosted by the service provider computer 104 and accessible via the browser application 102A and/or the application 102B.

At 604, the service provider computer 104 may transmit a transaction request message to the resource provider computer 108. Upon receipt, the resource provider computer 108 may be configured to initiate an authentication process and/or a cryptogram provisioning processing at 606. For example, the resource provider computer 108 may determine that a token may be requested for the payment credentials. By way of example, the resource provider computer 108 may determine that the transaction request message include a PAN and not a payment token. The resource provider computer 108 may initiate the authentication process to obtain a token and/or token cryptogram. In some embodiments, the authentication process may authenticate the transaction and provide a token and a separate cryptogram provisioning process may be initiated by the resource provider computer 108. The authentication process initiated may be in conformance with the method 400 described above in connection with FIG. 4. As part of the authentication process a token may be provisioned and returned to the resource provider computer 108. A cryptogram may be returned with the token, or as part of the cryptogram provisioning process described above in connection with FIG. 5.

In some embodiments, the resource provider computer 108 may erase any record of the payment credentials upon receipt of a token, such that the payment credentials are not stored at the resource provider computer 108. Thereafter, the resource provider computer 108 may utilize the token place of the payment credentials (e.g. for transaction authorization and record-keeping purposes).

In some embodiments, the resource provider computer 108 may already have access to a previously provisioned token that may be used for the transaction. In such embodiments, the resource provider computer 108 the method 600 may refrain from initiating an authentication process and/or a cryptogram provisioning processing at 606.

At 608, the resource provider computer 108 may send an authorization request message for the transaction to the transport computer 116. In some embodiments, the authorization request message may include the token instead of the real payment credentials. The authorization request message may also include transaction data (e.g. items purchased, amount, etc.), resource provider information (e.g. merchant name, merchant ID, location, etc.), user-specific data, and any other suitable information.

At 610, the transport computer 116 may forward the authorization request message to the transaction processing computer 118. At step 612, the transaction processing computer 118 may forward the authorization request message to the authorizing entity computer 112 (corresponding to the payment credentials and/or token).

At 614, the authorizing entity computer 112 may detokenize the payment token and obtain the payment credentials. For example, the authorizing entity computer 112 may obtain the payment credentials from the token provider computer 114. In some embodiments, the authorizing entity computer 112 may obtain the payment credentials from a local token record database. In some embodiments, any other suitable entity may instead detokenize the payment token. For example, the transaction processing computer 118 may detokenize the payment token (via the token provider computer 114 or via a local token record database) before forwarding the authorization request message to the authorizing entity computer 112.

At 616, the authorizing entity computer 112 may authorize or reject the transaction based on the payment credentials. For example, the authorizing entity computer 112 may identify the payment account associated with the payment credentials and/or payment token, and may determine whether there are sufficient funds.

At 618, the authorizing entity computer 112 may send an authorization response indicating whether the transaction was authorized to the transaction processing computer 118. The authorization response message may include the payment token, transaction details, merchant information, and any other suitable information. In some embodiments, in order to protect the payment credentials by limiting exposure, the authorization response message may not include the payment credentials.

At 620, the transaction processing computer 118 may forward the authorization response message to the transport computer 116. At 622, the transport computer 116 may forward the authorization response message to the resource provider computer 108.

At 624, the resource provider computer 108 may release the purchased goods and/or services to the user based on the authorization response message. Further, the resource provider computer 108 may store a transaction record including the payment token, user information, transaction details, and any other suitable information. In some embodiments, the resource provider computer 108 may erase any sensitive information, such as the encrypted or unencrypted payment credentials, but the resource provider computer 108 may store remaining information, such as the payment token.

At 626, the resource provider computer 108 may transmit a transaction response message to the service provider computer 104 indicating that the transaction was successful or unsuccessful. The transaction response message may be forwarded from by the service provider computer 104 to the user computing device 102 at 628. In some embodiments, information from the transaction response message may be provided for display on the user computing device 102.

At the end of the day or at another time, a clearing and settlement process can take place. The token may be used by the resource provider computer 108, the token provider computer 114, and the transaction processing computer 118 to determine the real account identifier. This real account identifier may then be used with to settle the transaction with the authorizing entity computer 112 via the transaction processing computer 118.

Embodiments of the present invention may also provide for faster transaction processing as it reduces the friction that occurs in transactions by combining a token request process within a secure authentication process conducted by a secure authentication system. While conventional systems require separate messages to be transmitted to request authentication and token provisioning, the methods and systems provided herein enable authentication and token provisioning to occur by initiating a single message (e.g., an authentication request message). Additionally, while conventional authentication response message provided information related to authentication success/failure, the techniques described herein enable additional information (e.g., user-specific information) to be communicated within an authentication response message. Thus, alleviating the need for a separate interface and/or an additional message to be utilized in order to obtain such information as would be found in conventional systems.

Reducing the number of messages need to perform multiples tasks (e.g., token provisioning, authentication, data requests) also has the benefit of reducing the amount of system resources required perform such tasks between multiple computers systems and devices.

The various participants and elements described herein may operate one or more computer apparatuses to facilitate the functions described herein. Any of the elements in the above-described figures, including any servers or databases, may use any suitable number of subsystems to facilitate the functions described herein.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
    receiving, by a directory server computer from a resource provider computer, an authentication request message including transaction data and a token request indicator, each portion of the transaction data being different from a token;
    transmitting the authentication request message to an access control server computer associated with an authorizing entity, wherein receipt of the authentication request message causes the access control server computer to authenticate a user and transmit an authentication response message;
    receiving, by the directory server computer, the authentication response message;
    in response to identifying that the token request indicator was included in the authentication request message, transmitting, by the directory server computer to a token provider computer, a token request message requesting a new token, the token request message being transmitted based at least in part on the token request indicator, wherein transmitting the token request message causes the token provider computer to provision the new token and generate an association between the new token and an identifier of the transaction data, wherein a cryptogram corresponding to the new token is generated as part of generating the new token, wherein the token provider computer maintains a mapping between the new token, the cryptogram, and the identifier of the transaction data;
    receiving, by the directory server computer, the new token from the token provider computer;
    modifying, by the directory server computer, the authentication response message to include the new token; and
    transmitting, by the directory server computer, the authentication response message as modified to the resource provider computer.

2. The computer-implemented method of claim 1, further comprising:
    receiving, by the directory server computer from the resource provider computer, a cryptogram request message associated with the new token, wherein receipt of the cryptogram request message causes the directory server computer to:
    transmit the cryptogram request message to the token provider computer; and
    receive, from the token provider computer, a cryptogram response message comprising a cryptogram associated with the new token from the token provider computer; and
    transmitting, by the directory server computer to the resource provider computer, the cryptogram response message comprising the cryptogram associated with the new token.

3. The computer-implemented method of claim 2, wherein the cryptogram is associated with one or more token restrictions.

4. The computer-implemented method of claim 1, wherein transmitting the authentication response message as modified to the resource provider computer causes the resource provider computer to:
    generate an authorization request message comprising the new token; and
    transmit, to an authorizing entity computer, the authorization request message comprising the new token.

5. The computer-implemented method of claim 1, further comprising:
    transmitting a data request message to the access control server computer; and
    receiving, from the access control server computer, a data response message comprising user-specific data associated with the user, wherein the authentication response message received from the directory server computer further comprises the user-specific data received from the access control server computer.

6. The computer-implemented method of claim 1, wherein receipt of the authentication request message further causes the access control server computer to provide user-specific data associated with the user within the authentication response message transmitted to the directory server computer.

7. The computer-implemented method of claim 6, wherein the user-specific data comprises at least one of: a billing address, a phone number, an electronic mail address, an account identifier, or transaction device data associated with the user.

8. A directory server computer, comprising:
    a processor, and
    a computer readable medium coupled to the processor, the computer readable medium comprising code, executable by the processor, for implementing a method comprising:
    receiving, from a resource provider computer, an authentication request message including transaction data and a token request indicator, each portion of the transaction data being different from a token;
    transmitting the authentication request message to an access control server computer associated with an authorizing entity, wherein receipt of the authentication request message causes the access control server computer to authenticate a user and transmit an authentication response message;
    receiving the authentication response message;
    in response to identifying that the token request indicator was included in the authentication request message, transmitting, to a token provider computer, a token request message requesting a new token, the token request message being transmitted based at least in part on the token request indicator, wherein transmitting the token request message causes the token provider computer to provision the new token and generate an association between the new token and an identifier of the transaction data, wherein a cryptogram corresponding to the new token is generated as part of generating the new token, wherein the token provider computer maintains a mapping between the new token, the cryptogram, and the identifier of the transaction data;
    receiving the new token from the token provider computer;
    modifying the authentication response message to include the new token; and
    transmitting the authentication response message as modified to the resource provider computer.

9. The directory server computer of claim 8, the method further comprising:
receiving, from the resource provider computer, a cryptogram request message associated with the new token, wherein receipt of the cryptogram request message causes the directory server computer obtain a cryptogram associated with the new token from the token provider computer; and
transmitting, to the resource provider computer, a cryptogram response message comprising the cryptogram associated with the new token.

10. The directory server computer of claim 8, wherein transmitting the authentication response message as modified causes the resource provider computer to transmit an authorization request message comprising the new token.

11. The directory server computer of claim 8, wherein receipt of the authentication request message by the access control server computer further causes the access control server computer to provide user-specific data associated with the user within the authentication response message.

12. The directory server computer of claim 8, wherein the new token is generated as part of an authentication process for authenticating the user associated with the transaction data.

13. A computer-implemented method, comprising:
receiving, by a resource provider computer associated with a resource provider, transaction data corresponding to a transaction, each portion of the transaction data being different from a token;
transmitting, by the resource provider computer to a directory server computer, an authentication request message including the transaction data and a token request indicator, wherein the directory server computer subsequently transmits the authentication request message to an access control server computer associated with an authorizing entity, wherein receipt of the authentication request message causes the access control server computer to authenticate a user and transmit an authentication response message to the directory server computer; and
receiving, by the resource provider computer from the directory server computer, the authentication response message comprising a new token, wherein the new token is provisioned by a token provider computer and obtained by the directory server computer from the token provider computer based at least in part on inclusion of the token request indicator in the authentication request message, and wherein provisioning the new token comprises generating the new token and generating an association between the new token and a portion of the transaction data, wherein the token provider computer provisions a cryptogram corresponding to the new token as part of generating the new token, wherein the association is updated to maintain a mapping between the new token, the portion of the transaction data, and the cryptogram.

14. The computer-implemented method of claim 13, further comprising:
generating, by the resource provider computer, an authorization request message comprising the token; and
transmitting the authorization request message comprising the token to an authorization entity computer for the transaction.

15. The computer-implemented method of claim 13, wherein the receipt of the authentication request message further causes the directory server computer to:
transmit a data request message to the access control server computer; and
receive, from the access control server computer, a data response message comprising user-specific data associated with the user.

16. The computer-implemented method of claim 15, wherein the directory server computer updates the authentication response message to comprise the user-specific data received from the access control server computer.

17. The computer-implemented method of claim 13, wherein the portion of the transaction data comprises an account identifier.

* * * * *